(12) United States Patent
Torii et al.

(10) Patent No.: US 8,267,368 B2
(45) Date of Patent: Sep. 18, 2012

(54) ELECTRONIC DEVICE

(75) Inventors: Takashi Torii, Osaka (JP); Masahiro Mizuta, Kyoto (JP)

(73) Assignee: Panasonic Corporation, Osaka (JP)

(*) Notice: Subject to any disclaimer, the term of this patent is extended or adjusted under 35 U.S.C. 154(b) by 366 days.

(21) Appl. No.: 12/475,804

(22) Filed: Jun. 1, 2009

(65) Prior Publication Data

US 2009/0302175 A1 Dec. 10, 2009

(30) Foreign Application Priority Data

Jun. 5, 2008 (JP) .................... 2008-148477

(51) Int. Cl.
*F16M 1/00* (2006.01)

(52) U.S. Cl. .............. 248/677; 248/188.8; 248/673; 248/688

(58) Field of Classification Search ............ 248/188.6, 248/188.8, 649, 673, 677, 688; 16/321, 334, 16/375
See application file for complete search history.

(56) References Cited

U.S. PATENT DOCUMENTS

| | | | |
|---|---|---|---|
| 5,546,271 A * | 8/1996 | Gut et al. ............... | 361/679.11 |
| 7,364,126 B2 * | 4/2008 | Tsai et al. ............... | 248/188.8 |
| 7,681,859 B2 * | 3/2010 | Kim ....................... | 248/688 |
| 7,926,781 B2 * | 4/2011 | Wang ...................... | 248/685 |

FOREIGN PATENT DOCUMENTS

| | | | |
|---|---|---|---|
| JP | 61-109271 U | | 7/1986 |
| JP | 4-48866 U | | 4/1992 |
| JP | 10-51156 A | | 2/1998 |
| JP | 10051156 A | * | 2/1998 |
| JP | 2005-210149 | | 8/2005 |

* cited by examiner

*Primary Examiner* — Gwendolyn Baxter
(74) *Attorney, Agent, or Firm* — Hamre, Schumann, Mueller & Larson, P.C.

(57) ABSTRACT

An electronic device of the present invention includes a plate-shaped stand member rotatably attached to a back surface of the housing, and a holding member capable of holding the stand member at a predetermined upright support angle with respect to the back surface of the housing, wherein the holding member regulates the rotation of the stand member at a predetermined rotation angle exceeding the upright support angle from a stored position with respect to the housing. With such a configuration, an electronic device such as a portable television can be provided, in which a stand is unlikely to be broken even when the electronic device topples over and a pressing force further is applied thereto.

7 Claims, 16 Drawing Sheets

ELECTRONIC DEVICE

BACKGROUND OF THE INVENTION

1. Field of the Invention

The present invention relates to an electronic device.

2. Description of Related Art

Recently, digital terrestrial broadcasting for an electronic device using one of 13 segments of a broadcasting wave (hereinafter, referred to as one-segment broadcasting) has been started along with the start of digital terrestrial broadcasting. A portable television receiver (hereinafter, referred to as a portable television) capable of receiving one-segment broadcasting is being distributed.

Such a portable television can be watched while being held by the hand of a user or watched while being placed on a desk. A portable television that can be watched while being placed on a desk or the like may include a stand on a back surface of a housing (reverse surface of the plane on which a liquid crystal display is placed). The stand can support the portable television in an upright posture. The upright posture refers to the posture in which the liquid crystal display mounted on the portable television is substantially orthogonal to the upper surface of a desk or the like. JP 4-48866 U discloses an exemplary configuration of a stand.

The stand disclosed by JP 4-48866 U is used for a picture. Therefore, in order for the stand to support a heavy device such as a portable television in an upright posture, it is necessary to reinforce the stand.

FIG. 10 is a perspective view showing an external appearance of a conventional portable television 201. FIG. 11 is a top view of the conventional portable television 201. FIG. 12 is a side view of the conventional portable television. As shown in FIG. 10, the portable television includes a liquid crystal display 202 on a front surface. As shown in FIGS. 11 and 12, the portable television includes a stand 203 supported rotatably by a rotation shaft 204 on a back surface. The stand 203 is placed at a position indicated by a reference numeral 203a in FIG. 11 to be stored in the portable television 201 (stored position). The stand 203 is rotated from the position shown in FIG. 10 in a direction indicated by an arrow V to be placed at a position indicated by the reference numeral 203, whereby the stand 203 is allowed to protrude from the portable television 201 (protruding position). The angle through which the stand 203 can rotate (rotation angle from the stored position to the protruding position) is about 90°.

The stand shown in FIGS. 10 to 12 can support a heavy device such as a portable television in an upright posture. However, the stand 203 is made of resin or the like and thin, so that the stand 203 has low stiffness. Thus, the portable television 201 elastically deforms the stand 203 by the deadweight thereof, and may topple over on the back surface side in most cases. When the portable television 201 topples over on the back surface side, and a pressing force further is applied to the portable television 201 from the front surface side, the stand may be broken.

More specifically, when a pressing force is applied in a direction indicated by an arrow X while the stand 203 is placed at the protruding position shown in FIG. 12, the portable television 201 may topple over on the back surface side in many cases. FIG. 13 is a side view of the portable television 201 that has toppled over on the back surface side. As shown in FIG. 13, in the case where the portable television 201 topples over while the stand 203 is placed at the protruding position, and a pressing force is applied to the portable television 201 in a direction indicated by an arrow Y, the vicinity of the rotation shaft 204 may be broken. This is because the posture of the portable television 201 shown in FIG. 13 is such that the stand 203 is unlikely to flex, and the energy caused by the pressure is concentrated on the vicinity of the rotation shaft 204.

SUMMARY OF THE INVENTION

Therefore, with the foregoing in mind, it is an object of the present invention to make it difficult for a stand to be broken even when an electronic device such as a portable television topples over and a pressing force further is applied thereto.

An electronic device of the present invention includes a housing, a plate-shaped upright support member rotatably attached to a back surface of the housing, and a holding member capable of holding the upright support member at an upright support angle with respect to the back surface of the housing. The holding member includes a rotation regulating member capable of regulating a rotation of the upright support member at a rotation angle exceeding the upright support angle from a stored position with respect to the housing, and a load providing portion that provides a rotation load to the upright support member while the upright support member is rotated from the stored position to a stop position having a rotation angle exceeding the upright support angle. The load providing portion supplies the upright support member with a rotation load higher than that applied to the upright support member while the upright support member is rotated from the stored position to a position having the upright support angle.

According to the present invention, a stand is unlikely to be broken even when an electronic device topples over and a pressing force further is applied thereto.

DETAILED DESCRIPTION OF THE INVENTION

An electronic device of the present invention includes a housing, a plate-shaped upright support member rotatably attached to a back surface of the housing, and a holding member capable of holding the upright support member at an upright support angle with respect to the back surface of the housing. The holding member includes a rotation regulating member capable of regulating a rotation of the upright support member at a rotation angle exceeding the upright support angle from a stored position with respect to the housing, and a load providing portion that provides a rotation load to the upright support member while the upright support member is rotated from the stored position to a stop position having a rotation angle exceeding the upright support angle. The load providing portion supplies the upright support member with a rotation load higher than that applied to the upright support member while the upright support member is rotated from the stored position to a position having the upright support angle.

The electronic device of the present invention can have the following aspect on the basis of the above configuration.

More specifically, in the electronic device of the present invention, the upright support member can be formed of a flexible material. With such a configuration, even when the electronic device topples over with the upright support member placed on the lower side and a pressing force is applied thereto while the upright support member is placed at a stop position having a predetermined rotation angle exceeding the upright support angle, the energy caused by the pressing force can be dispersed by the elastic deformation of the upright support member, so that a portion supporting the upright support member in the housing can be prevented from being broken.

Embodiment

1. Configuration of an Electronic Device

In an embodiment, a portable television will be illustrated as an exemplary electronic device.

Figure 1A:
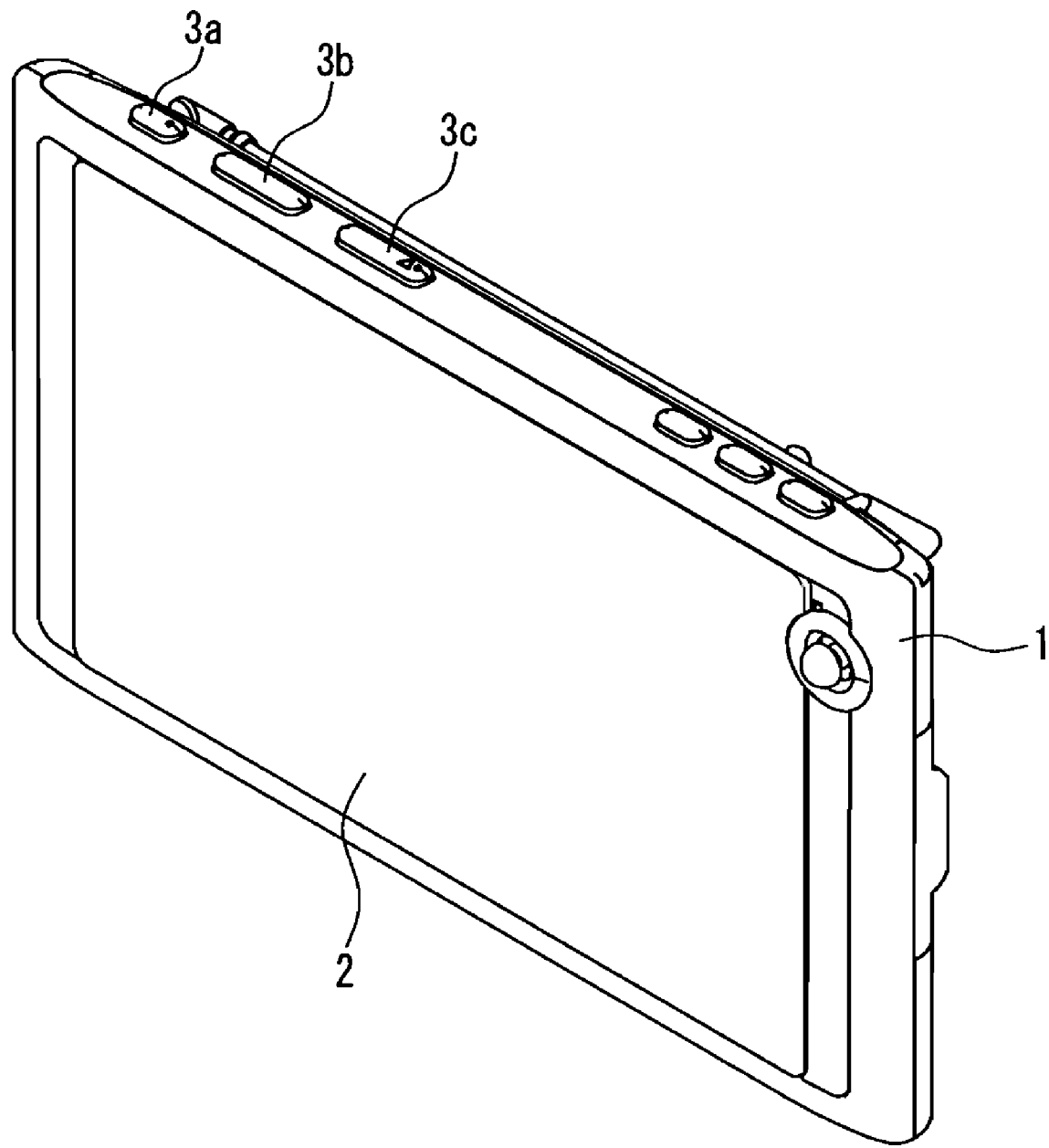
FIG. 1A is a perspective view showing an outer appearance of an electronic device according to an embodiment.
Figure 1B:
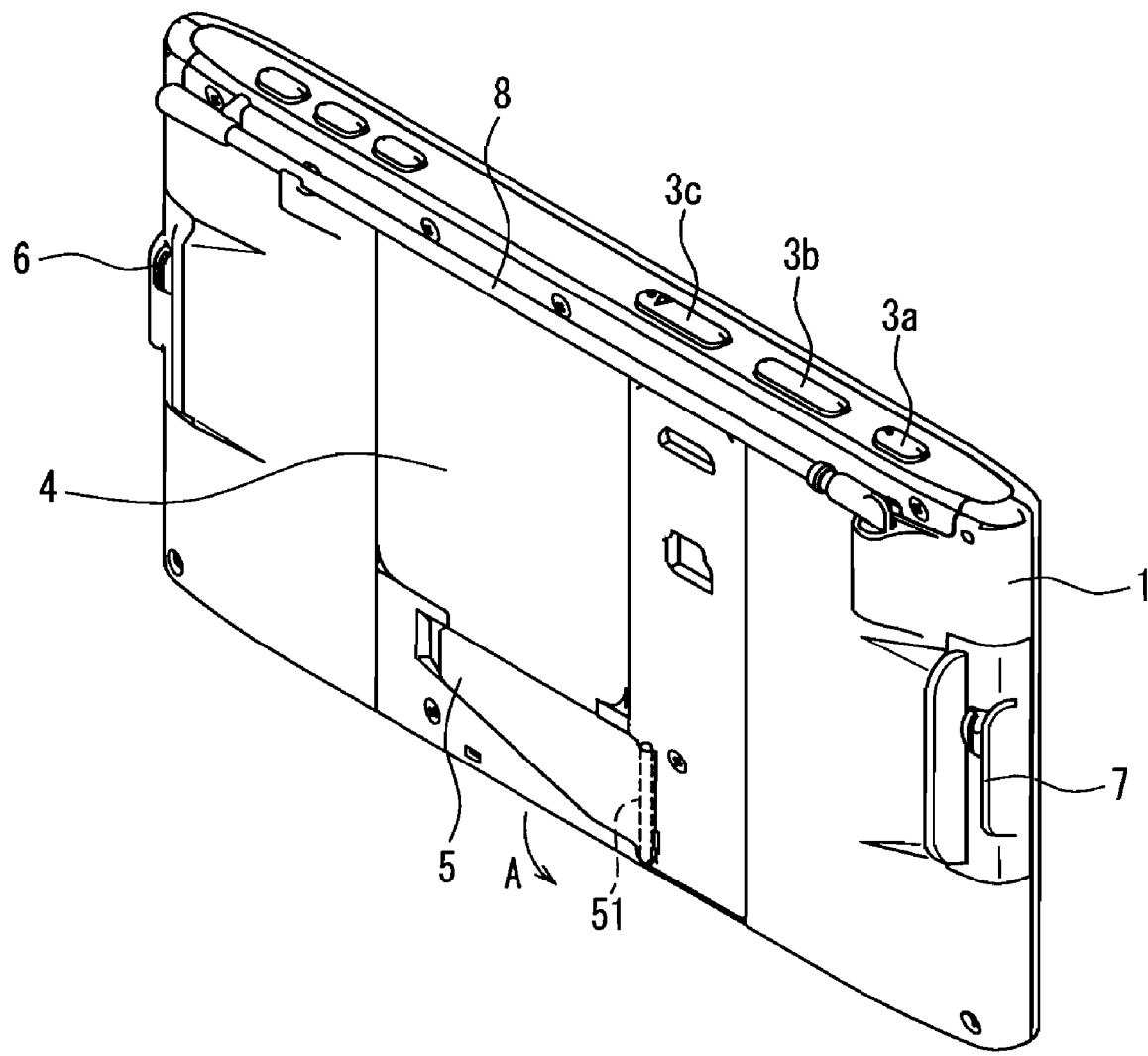
FIG. 1B is a perspective view showing an outer appearance of the electronic device according to the embodiment.

FIG. 1A is a perspective view of the front surface side of a portable television. FIG. 1B is a perspective view of the back surface side of the portable television. In the present embodiment, although the portable television is illustrated as an exemplary electronic device, any device used at least in an upright posture may be used.

As shown in FIG. 1A, the portable television includes a liquid crystal display 2 on the front surface of a thin housing 1. The liquid crystal display 2 can display a color video. The liquid crystal display 2 can display a video obtained by demodulating a broadcasting wave received by a receiver built in the portable television. The size of an effective display area of the liquid crystal display 2 is set to be about 5 inches. Any display capable of displaying at least a video may be mounted on the portable television instead of the liquid crystal display. The display to be mounted on the portable television can be realized by an organic EL display.

The housing 1 includes a power switch 3a, a channel switch 3b, and a volume adjustment switch 3c on the upper surface. The power switch 3a is capable of switching on/off the power supply of the portable television. The channel switch 3b is capable of switching the channel of a broadcasting wave received by the receiver. The volume adjustment switch 3c is capable of adjusting the volume of a sound output from a speaker built in the portable television.

The housing 1 includes a memory card slot (not shown) and a first cover member 6 on the right side surface. The memory card slot allows a memory card capable of storing video information and the like to be attached or detached with respect thereto. The first cover member 6 is capable of opening or closing the memory card slot.

As shown in FIG. 1B, the housing 1 includes a battery storage portion (not shown), a battery lid (not shown), a stand member 5 (plate shaped upright member), and an antenna 8 on the back surface. The battery storage portion is capable of storing a battery. The battery lid is capable of opening or closing the battery storage portion.

The housing 1 includes an input/output terminal (not shown) and a second cover member 7 on the left side surface. The second cover member 7 is capable of opening or closing the input/output terminal. The "left side surface of the housing 1" corresponds to the side surface that is positioned on the left side viewed from a user when the housing 1 is placed in a posture with the liquid crystal display 2 opposed to the user.

The stand member 5 is formed of a flexible material. The stand member 5 preferably is formed of plastic. The stand member 5 preferably is formed of polycarbonate, which is a kind of thermosetting plastic. The stand member 5 can be rotated about a spindle 51. The stand member 5 can be rotated from a stored position shown in FIG. 1B in a direction indicated by an arrow A.

Figure 2A:
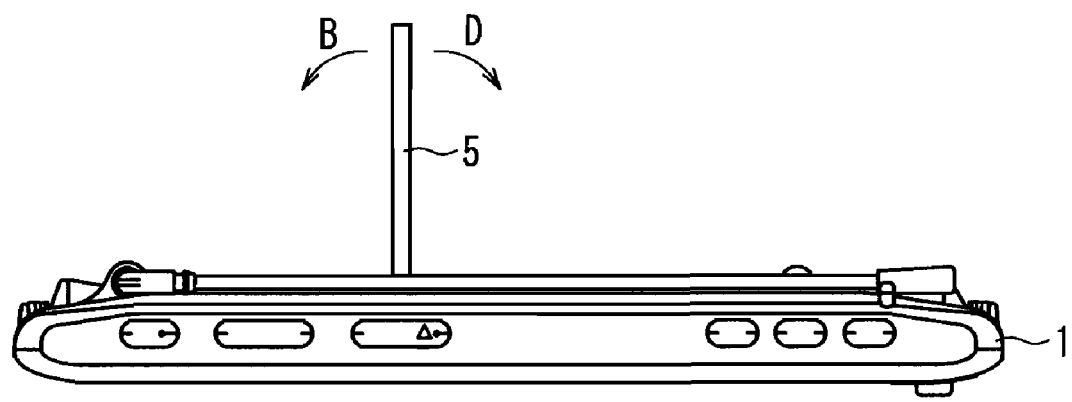
FIG. 2A is a top view of the electronic device.
Figure 2B:
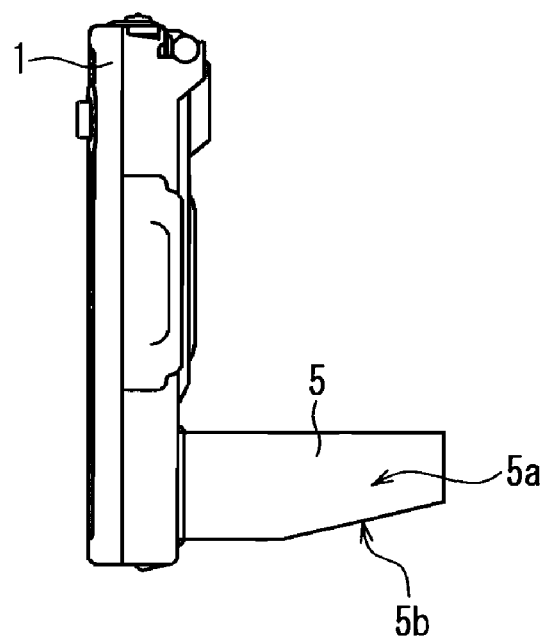
FIG. 2B is a right side view of the electronic device.
Figure 3:
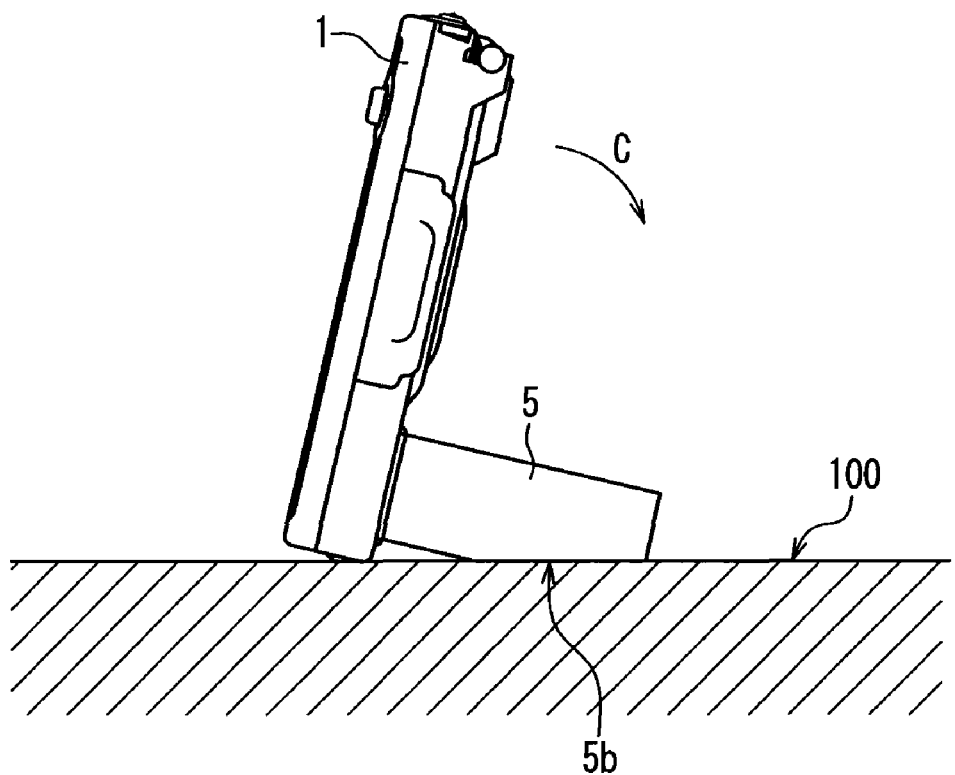
FIG. 3 is a right side view showing a state in which the electronic device is placed on an installation surface.

FIG. 2A is a top view of the portable television. FIG. 2B is a right side view of the portable television. FIGS. 2A and 2B show a state in which the stand member 5 has been rotated by about 90° from the stored position in the direction indicated by the arrow A The position of the stand member 5 shown in FIGS. 2A and 2B will be referred to as a "first protruding position". FIG. 3 is a side view showing a state in which the portable television is placed on an installation surface 100 of a desk or the like.

As shown in FIG. 3, the portable television can be placed on the installation surface 100 of a desk or the like in an upright posture by placing the stand member 5 at the first protruding position.

A lower surface 5b of the stand member 5 is inclined slightly with respect to a line orthogonal to the front surface of the housing 1. As a result, when the portable television is placed on the installation surface 100 in an upright posture, the display surface of the liquid crystal display 2 is inclined with respect to the installation surface 100. The display surface of the liquid crystal display 2 is directed in an upper diagonal direction. When the display surface is directed in an upper diagonal direction, the user can watch a video displayed on the liquid crystal display 2 easily. For example, in the case where the portable television is placed on a desk in the posture shown in FIG. 3, and the user sits on a chair and watches a video displayed on the liquid crystal display 2, it is preferred that the display surface of the liquid crystal display 2 is orthogonal to the user's line of sight because high viewability can be ensured. In the present embodiment, the stand member 5 is provided with the inclined lower surface 5b, whereby the display surface is directed in an upper diagonal direction, which enhances the viewability of the liquid crystal display 2.

At the first protruding position shown in FIG. 2A, the stand member 5 is placed at a position where the longitudinal direction thereof is substantially orthogonal to the back surface of the housing 1. Thus, the portable television is unlikely to topple over on the back surface side (in a direction indicated by an arrow C in FIG. 3) when the portable television is placed on the installation surface 100 in an upright posture, whereby the posture of the portable television is stabilized.

Figure 4:
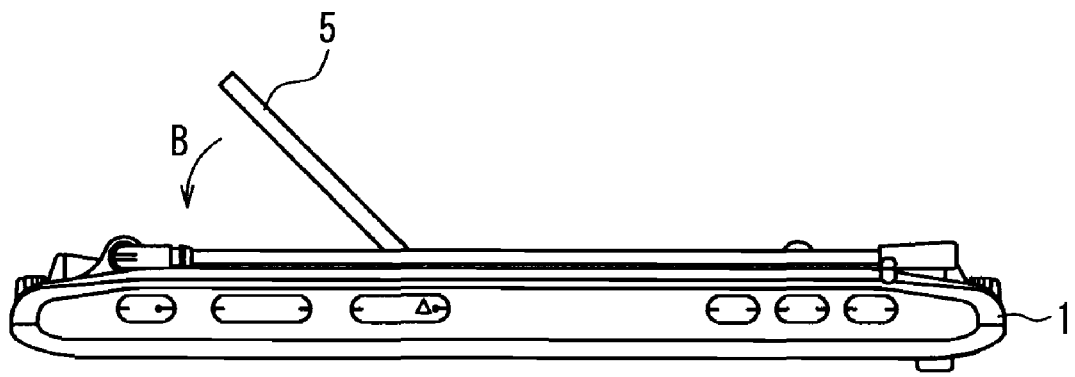
FIG. 4 is a top view of the electronic device.

The stand member 5 can be rotated from the first protruding position shown in FIG. 2A in a direction indicated by an arrow B. FIG. 4 is a top view of the portable television in a state where the stand member 5 is placed at a second protruding position. The second protruding position corresponds to the position where the stand member 5 is rotated from the first protruding position to a side opposite to the stored position. The rotation angle from the stored position to the second protruding position of the stand member 5 is set to be about 135° in the present embodiment. The rotation angle from the first protruding position to the second protruding position of the stand member 5 is set to be about 45° in the present embodiment. When the stand member 5 is placed at the second protruding position, the rotation thereof in the direction indicated by the arrow B is regulated.

The stand member 5 is rotated from the first protruding position shown in FIG. 2A in a direction indicated by an arrow D, thereby being displaced to the stored position shown in FIG. 1B.

Figure 5:
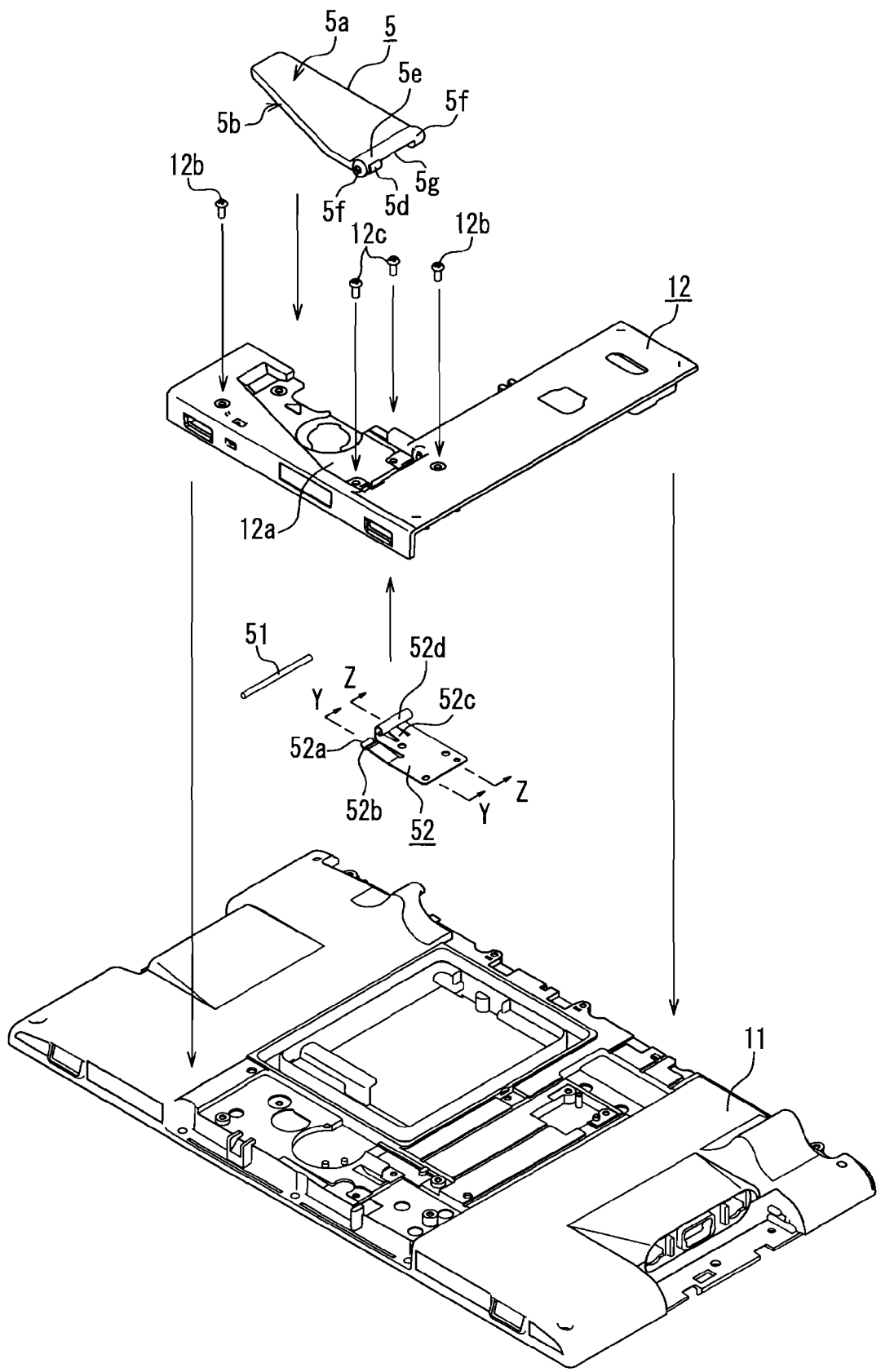
FIG. 5 is an exploded perspective view of the electronic device.

FIG. 5 is an exploded perspective view of the stand member 5 and a mechanism that supports the stand member 5 with respect to the housing 1. The mechanism mainly includes the spindle 51 and a holding member 52. Both ends of the spindle 51 are supported by a back surface housing 12. The spindle 51 supports the stand member 5 in an intermediate portion. The spindle 51 supports the stand member 5 so that the stand member 5 can be rotated. The back surface housing 12 is provided with a concave portion 12a. The concave portion 12a can accommodate the stand member 5. The holding member 52 gives the stand member 5 a click feeling at the stored position and the protruding position.

The stand member 5 includes a first protrusion 5c, a second protrusion 5d, an arc portion 5e, support portions 5f, and an end portion 5g. The support portions 5f have holes that support the spindle 51 rotatably. The first protrusion 5c is formed on an outer circumferential cylindrical surface of the support portion 5f (see FIG. 6A and the like described later). The second protrusion 5d is formed on the outer circumferential cylindrical surface of the support portions 5f. The arc portion 5e is a part of the outer circumferential cylindrical surface of the support portions 5f. The end portion 5g is formed between the two support portions 5f. The first protrusion 5c is formed so as to protrude in a direction orthogonal to a surface 5a of the stand member 5. The second protrusion 5d is formed so as to protrude in a plane direction of the surface 5a of the stand member 5.

The concave portion 12a preferably has such a depth that the surface 5a of the stand member 5 is flush with or lower than the back surface of the housing 1, when the stand member 5 is placed at the stored position (see FIG. 1B). The stand member 5 does not protrude or only slightly protrudes, if at all, from the back surface of the housing 1, when the stand member 5 is at the stored position. Thus, the stand member 5 can be designed so as not to be caught by a seam inside a bag, for example, when the portable television is placed in or taken out from the bag, whereby the stand member 5 can be prevented from being broken.

The concave portion 12a preferably has a bottom area larger than the area of the surface 5a of the stand member 5. With such a configuration, while the stand member 5 is stored in the concave portion 12a, a gap can be provided between the stand member 5 and the inner wall of the concave portion 12a. Thus, the user easily can grasp the end portion of the stand member 5 with the fingers or the like and easily can rotate the stand member 5 to the first protruding position from the stored position.

The holding member 52 is fixed to the reverse side of the back surface housing 12 with a screw (not shown). The holding member 52 includes a click spring portion 52a, a plate spring portion 52c, and a support portion 52d. The click spring portion 52a gives a rotation load to the stand member 5 when the stand member 5 is placed at the stored position or the first protruding position. The plate spring portion 52c gives an urging force to the stand member 5 when the stand member 5 is positioned between the first protruding position and the second protruding position. The support portion 52d holds the spindle 51 with play. The click spring portion 52a includes a concave portion 52b. The first protrusion 5c and the second protrusion 5d formed at the stand member 5 can be fitted selectively in the concave portion 52b.

2. Rotation Mechanism of a Stand Member 5

Figure 6A:
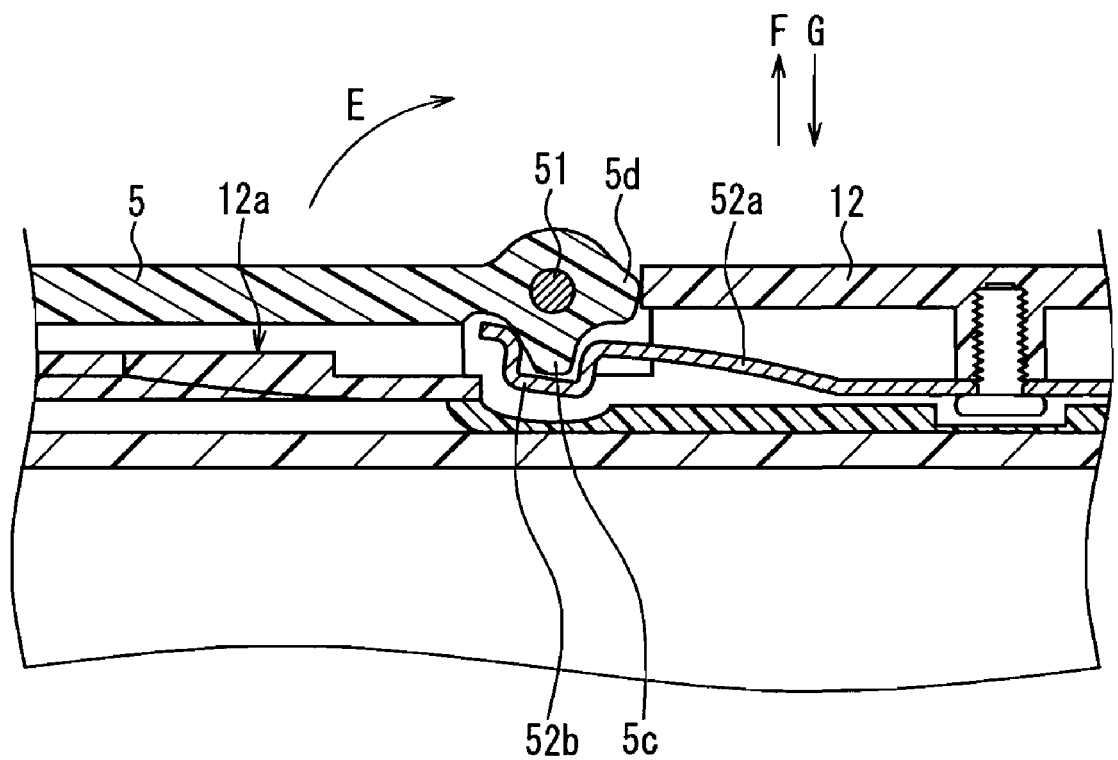
FIG. 6A is a cross-sectional view showing a state in which a stand member is placed at a stored position in the electronic device.
Figure 6B:
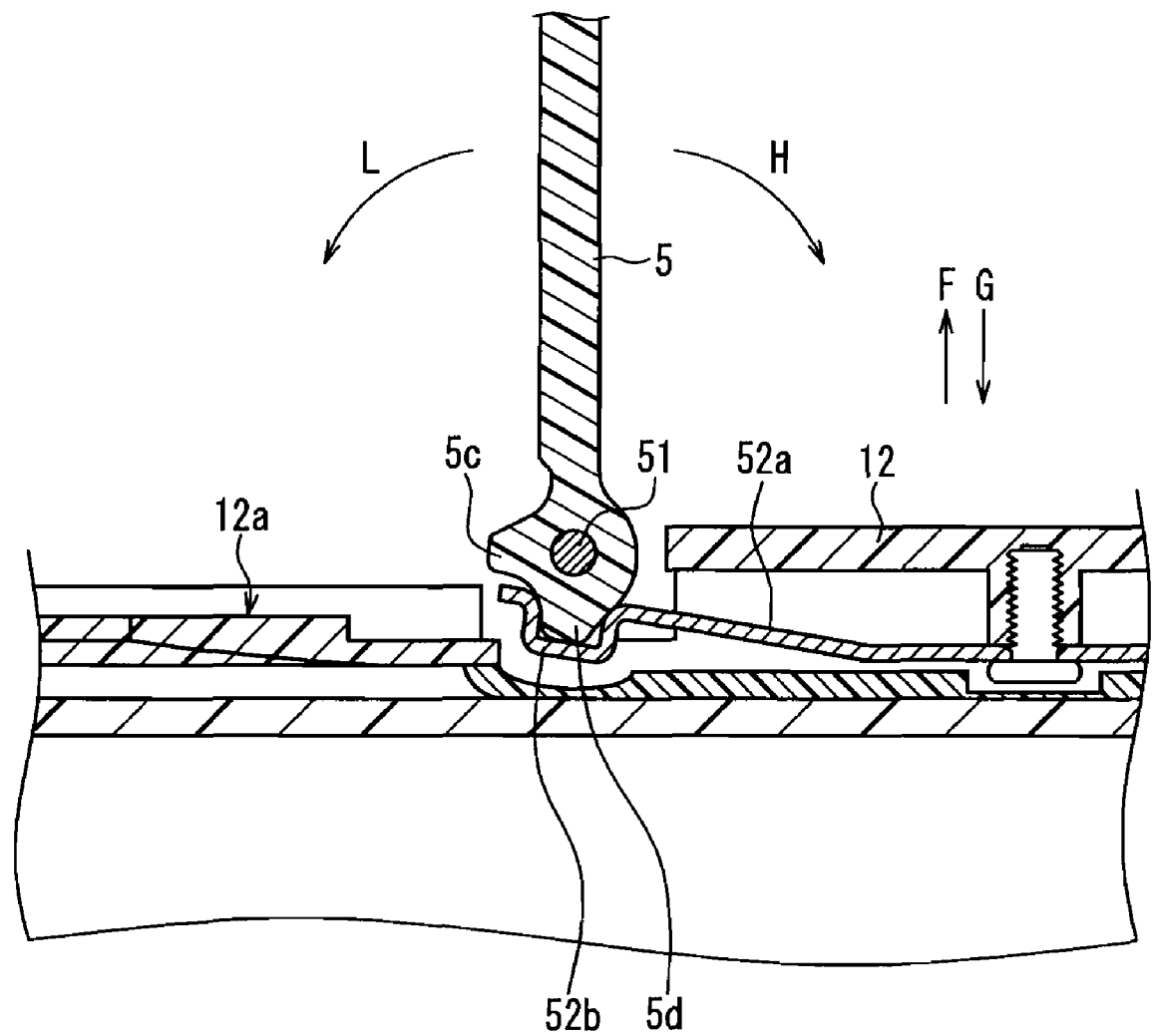
FIG. 6B is a cross-sectional view showing a state in which the stand member is placed at a first protruding position in the electronic device.
Figure 6C:
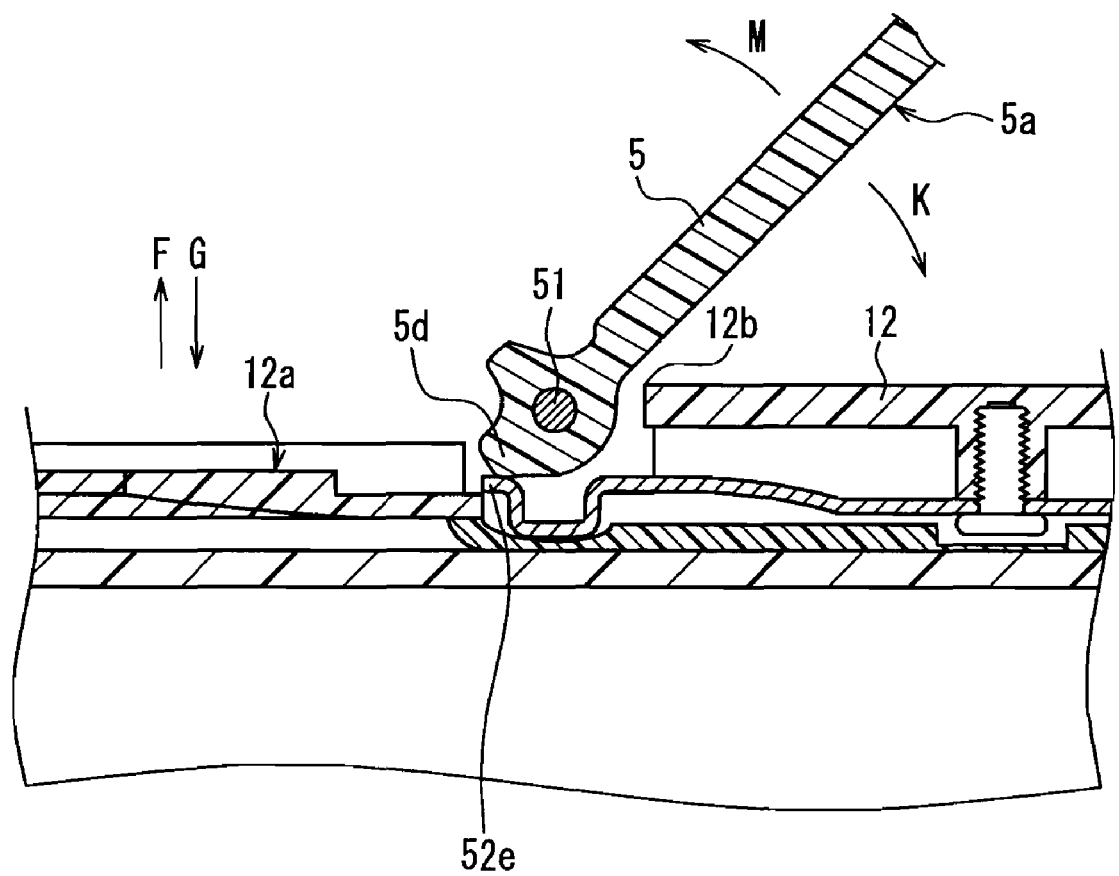
FIG. 6C is a cross-sectional view showing a state in which the stand member is placed at a second protruding position in the electronic device.

FIGS. 6A to 6C are cross-sectional views of the stand member 5 and a member supporting the stand member 5. FIGS. 6A to 6C show a cross-sectional configuration taken along a Y-Y line in FIG. 5.

As shown in FIG. 6A, when the stand member 5 is placed at the stored position, the first protrusion 5c is fitted in the concave portion 52b formed in the click spring portion 52a. At this time, the click spring portion 52a is pressed by the first protrusion 5c to be deformed elastically in a direction indicated by an arrow G. This causes the click spring portion 52a to give a rotation load (click feeling) to the stand member 5, and regulates the rotation of the stand member 5 in a direction indicated by an arrow E.

When the stand member 5 is rotated from the state shown in FIG. 6A in the direction indicated by the arrow E, the first protrusion 5c comes off from the concave portion 52b while pressing and elastically deforming the click spring portion 52a in a direction indicated by an arrow G. The stand member 5 is displaced to the first protruding position shown in FIG. 6B when rotated by about 90° from the stored position.

As shown in FIG. 6B, when the stand member 5 is displaced to the first protruding position, the second protrusion 5d is fitted in the concave portion 52b. The click spring portion 52a is pressed by the second protrusion 5d to be deformed elastically in the direction indicated by the arrow G. This causes the click spring portion 52a to give a rotation load (click feeling) to the stand member 5, and regulates the rotation in the directions indicated by the arrows H and L.

When the stand member 5 is rotated from the state shown in FIG. 6B in the direction indicated by an arrow H, the second protrusion 5d comes off from the concave portion 52b while pressing and elastically deforming the click spring portion 52a in the direction indicated by the arrow G. The stand member 5 is displaced to the second protruding position shown in FIG. 6C when rotated by about 45° from the first protruding position.

As shown in FIG. 6C, when the stand member 5 is displaced to the second protruding position, the second protrusion 5d of the stand member 5 runs onto the end portion 52e of the click spring portion 52a and presses and elastically deforms the click spring portion 52a in the direction indicated by the arrow G.

Until the second protrusion 5d comes off from the concave portion 52b and the stand member 5 reaches the second protruding position, the stand member 5 presses and elastically deforms the click spring portion 52a. Thus, the stand member 5 is supplied with a pressing force in the direction indicated by the arrow F and a rotation load.

Furthermore, even when the stand member 5 is pressed from the second protruding position shown in FIG. 6C further in the direction indicated by the arrow K, since the rotation in the direction indicated by the arrow K is regulated, the stand member 5 is not rotated in the direction indicated by the arrow K. The specific rotation regulating mechanism of the stand member 5 will be described later. The stand member 5 is formed of a flexible material, so that the stand member 5 can flex when pressed in the direction indicated by the arrow K from the state shown in FIG. 6C.

Furthermore, when the stand member 5 is rotated from the second protruding position shown in FIG. 6C in the direction indicated by the arrow M, the stand member 5 can be displaced to the first protruding position shown in FIG. 6B. As described above, at the first protruding position, the second protrusion 5d is fitted in the concave portion 52b, so that the stand member 5 is supplied with a rotation load (click feeling).

Furthermore, when the stand member 5 is rotated from the first protruding position shown in FIG. 6B in a direction indicated by an arrow L, the stand member 5 can be displaced to the stored position shown in FIG. 6A. As described above, the first protrusion 5c is fitted in the concave portion 52b at the stored position, so that the stand member 5 is supplied with a rotation load (click feeling).

Figure 7A:
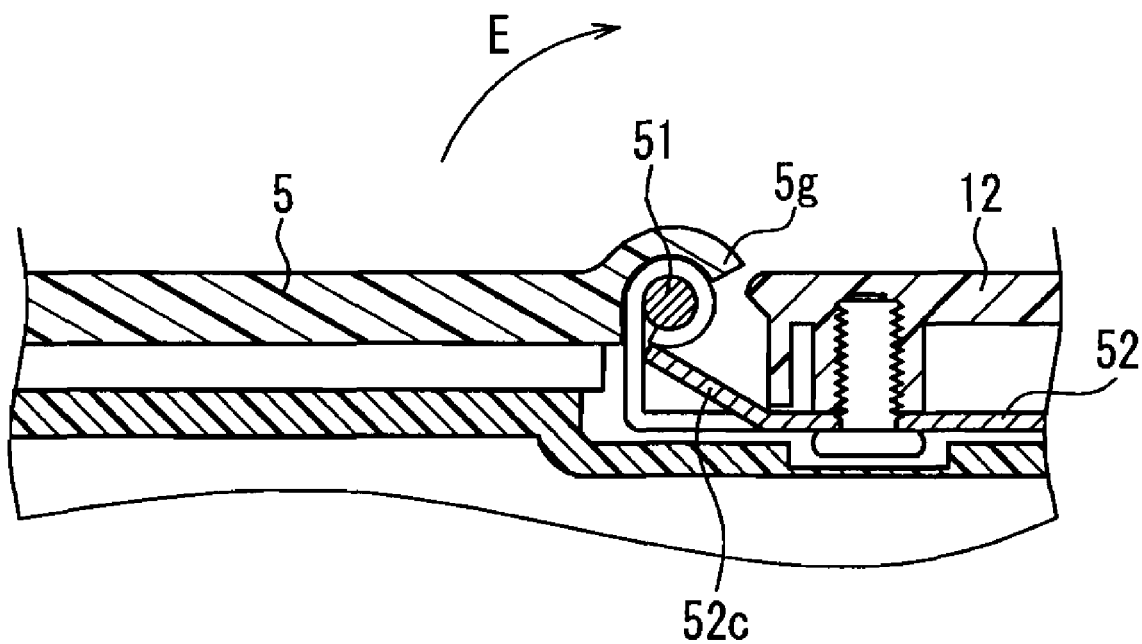
FIG. 7A is a cross-sectional view showing a state in which the stand member is placed at the stored position in the electronic device.
Figure 7B:
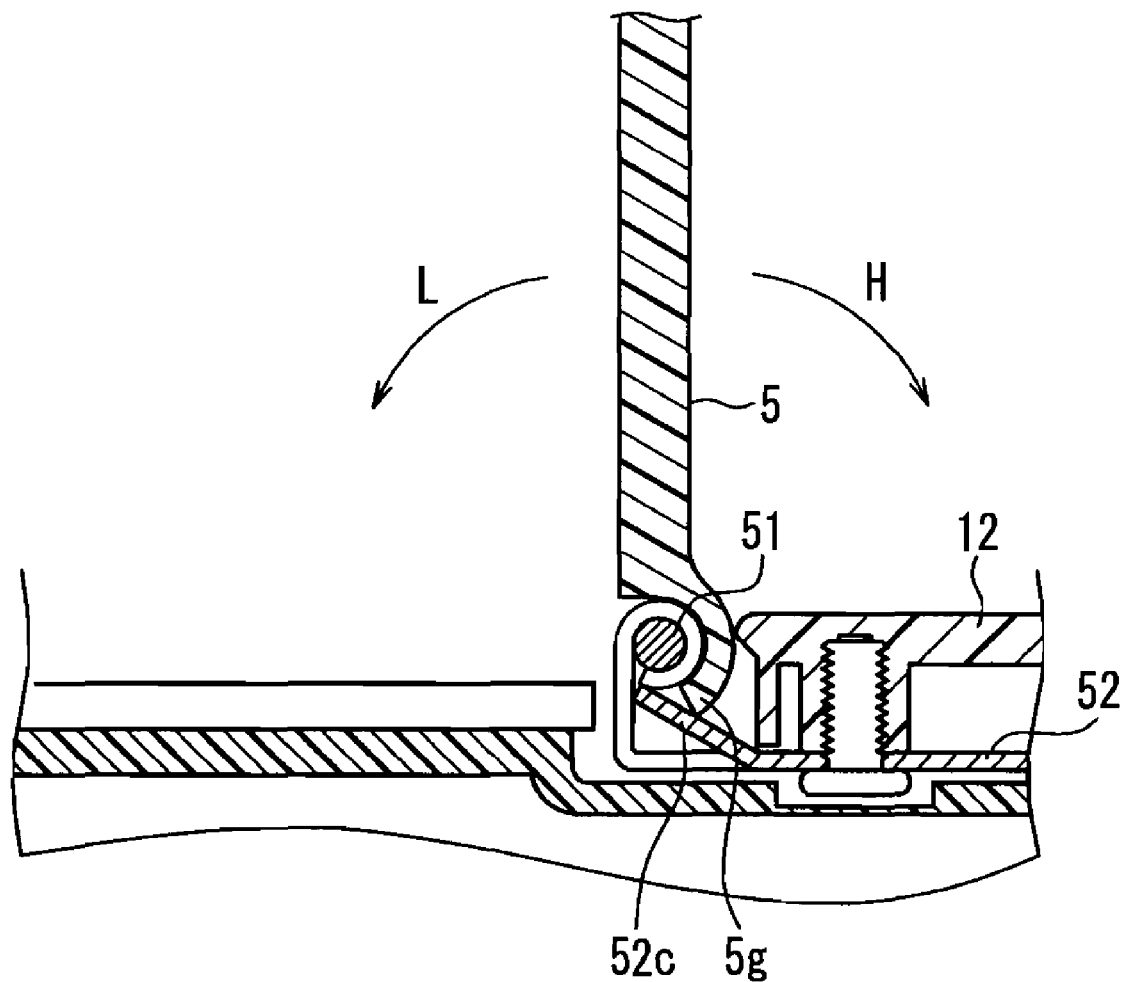
FIG. 7B is a cross-sectional view showing a state in which the stand member is placed at the first protruding position in the electronic device.
Figure 7C:
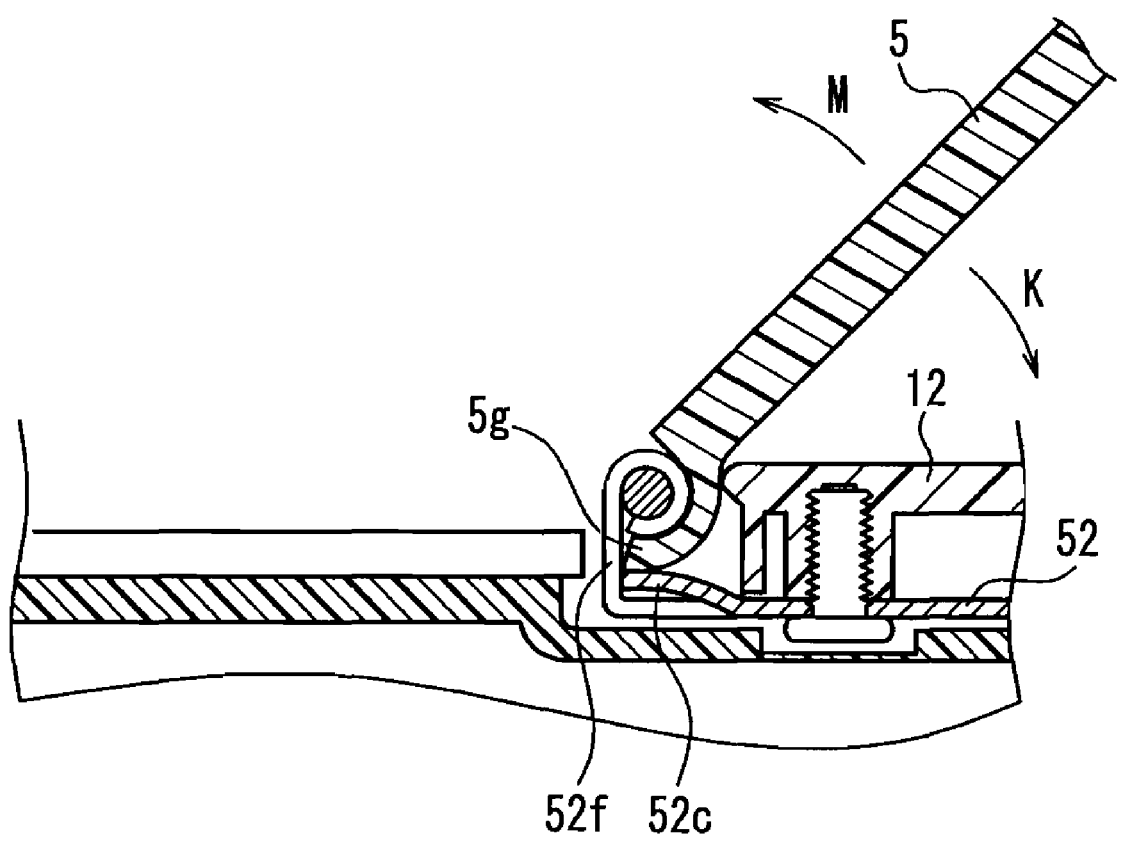
FIG. 7C is a cross-sectional view showing a state in which the stand member is placed at the second protruding position in the electronic device.

FIGS. 7A to 7C are cross-sectional views showing the vicinity of the stand member 5 in the portable television. FIGS. 7A to 7C show a cross-sectional configuration taken along a line Z-Z in FIG. 5.

As shown in FIG. 7A, when the stand member 5 is placed at the stored position, the end portion 5g of the stand member 5 is apart from the plate spring portion 52c.

As shown in FIG. 7B, when the stand member 5 is placed at the first protruding position, the end portion 5g is in contact with the plate spring portion 52c. At this time, the end portion 5g is only in contact with the plate spring portion 52c and does not elastically deform the plate spring portion 52c. When the stand member 5 is rotated from the state shown in FIG. 7B in the direction indicated by the arrow H, the end portion 5g presses and elastically deforms the plate spring portion 52c. This gives the stand member 5 a rotation load.

As shown in FIG. 7C, until the stand member 5 reaches the second protruding position, the end portion 5g presses and elastically deforms the plate spring portion 52c. As shown in FIG. 7C, when the stand member 5 is placed at the second protruding position, the end portion 5g abuts on a regulating portion 52f (rotation regulating member) of the holding member 52, thereby preventing the stand member 5 from being rotated in the direction indicated by the arrow K.

The plate spring portion 52c is provided at the holding member 52, and the stand member 5 is supplied with a rotation load when the stand member 5 is rotated between the first protruding position and the second protruding position, whereby the user can be notified that the section between the first protruding position and the second protruding position is not an ordinary rotation section. The "ordinary rotation section" refers to the rotation section between the stored position and the first protruding position of the stand member 5. The rotation section between the first and second protruding positions is provided so as to prevent the stand member 5 from being broken when the portable television topples over.

In the case where the rotation load of the stand member 5 is uniform between the stored position and the second protruding position, the user may rotate the stand member 5 from the first protruding position to the second protruding position. Thus, the portable television may be placed on a desk or the like while the stand member 5 is placed at the second protruding position. In this state, the portable television topples over on the back surface side easily, which damages the housing 1, etc.

In the present embodiment, the rotation load applied to the stand member 5 between the stored position and the first protruding position is set to be larger than that applied to the stand member 5 between the first protruding position and the second protruding position. The user can feel that the rotation load of the stand member 5 is increased when the user rotates the stand member 5 from the stored position to the first protruding position, and thereafter, rotates the stand member 5 from the first protruding position to the second protruding position. Thus, the user can be encouraged not to rotate the stand member 5 from the first protruding position to the second protruding position.

3. Behavior When a Portable Television Topples Over

As shown in FIG. 3, in the case where a pressing force is applied to the display surface of the liquid crystal display 2 when the stand member 5 is placed at the first protruding position and the portable television is placed on a desk or the like in an upright posture, the portable television tends to topple over in the direction indicated by the arrow C. At this time, the stand member 5 is rotated from the first protruding position in the direction indicated by the arrow D (see FIG. 2A) or the direction indicated by the arrow B (see FIG. 2A).

When the stand member 5 is rotated from the first protruding position in the direction indicated by the arrow B, the stand member 5 is stored in the concave portion 12a. When the stand member 5 is stored in the concave portion 12a, the back surface of the housing 1 of the portable television abuts on the installation surface 100 of the desk. This can prevent the stand member 5 from being damaged. This also can prevent the stand member 5 from coming off from the housing 1.

Figure 8A:
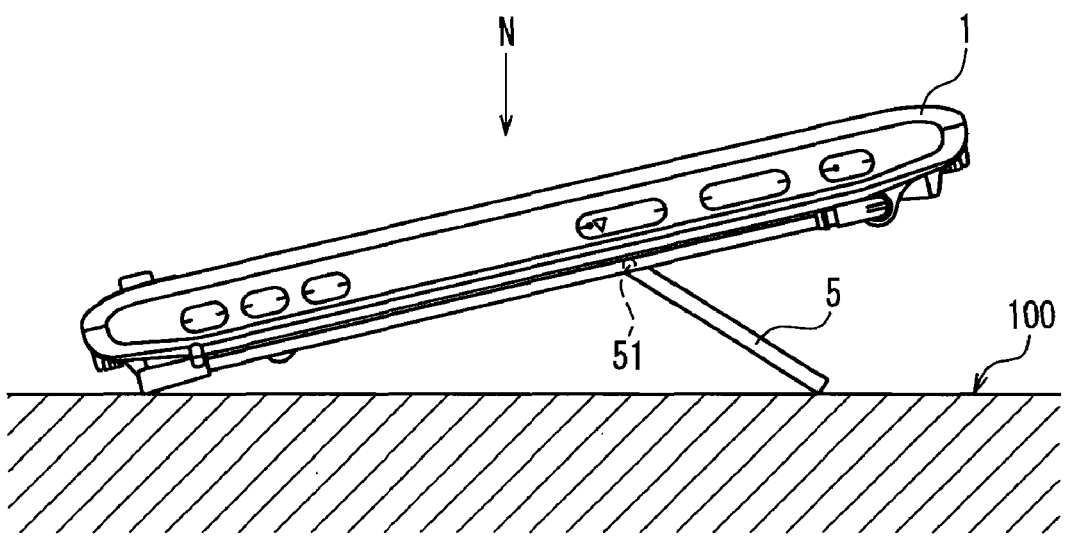
FIG. 8A is a side view showing a state in which the electronic device has toppled over on a back surface side.
Figure 8B:
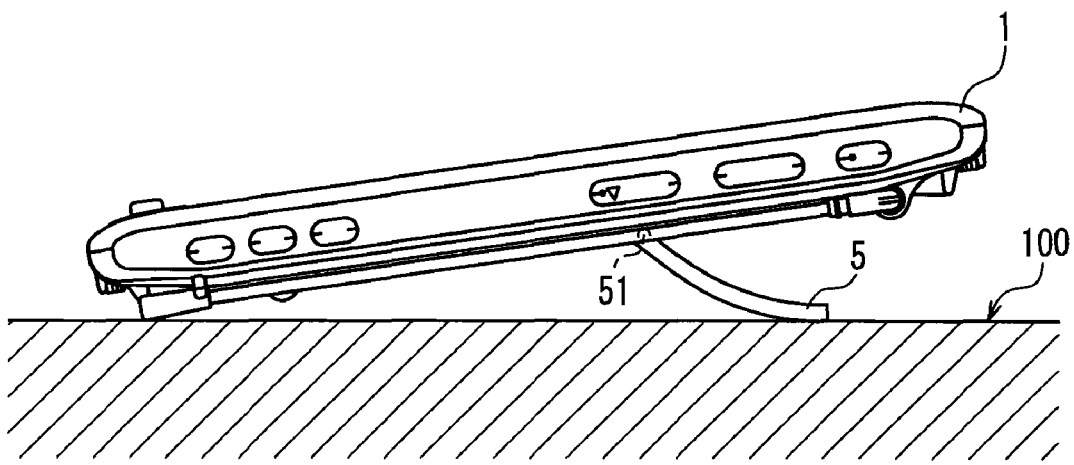
FIG. 8B is a side view showing a state in which the electronic device has toppled over on the back surface side and been pressed.

On the other hand, when the stand member 5 is rotated from the first protruding position in the direction indicated by the arrow D, the stand member 5 is placed in the state shown in FIG. 8A. In the state shown in FIG. 8A, a part of the back surface of the portable television and the stand member 5 are in contact with the installation surface 100. In this state, when a force in the direction indicated by an arrow N is applied to the housing 1, the stand member 5 is deformed elastically as shown in FIG. 8B since the inclination angle with respect to the direction indicated by the arrow N is large. More specifically, the force in the direction indicated by the arrow N applied to the housing 1 is dispersed by the elastic deformation of the stand member 5, whereby the force applied to the vicinity of the spindle 51 can be reduced. Thus, the vicinity of the spindle 51 in the stand member 5 can be prevented from being broken. Furthermore, the stand member 5 can be prevented from coming off from the housing 1.

4. Effects of an Embodiment, Etc.

According to the present embodiment, the stand member 5 can be rotated to the second protruding position further from the first protruding position, whereby the mechanism in the vicinity of the rotation shaft of the stand member 5 can be prevented from being broken. More specifically, even when a pressing force is applied to the display surface of the liquid crystal display 2 while the portable television is in an upright posture and the portable television topples over on the back surface side, and a force in the direction indicated by the arrow N in FIG. 8A is applied thereto, the stand member 5 is deformed elastically, so that the force applied to the vicinity of the spindle 51 of the stand member 5 can be reduced. This can prevent the stand member 5 from being broken, and also can prevent the stand member 5 from coming off from the housing 1.

Figure 9:
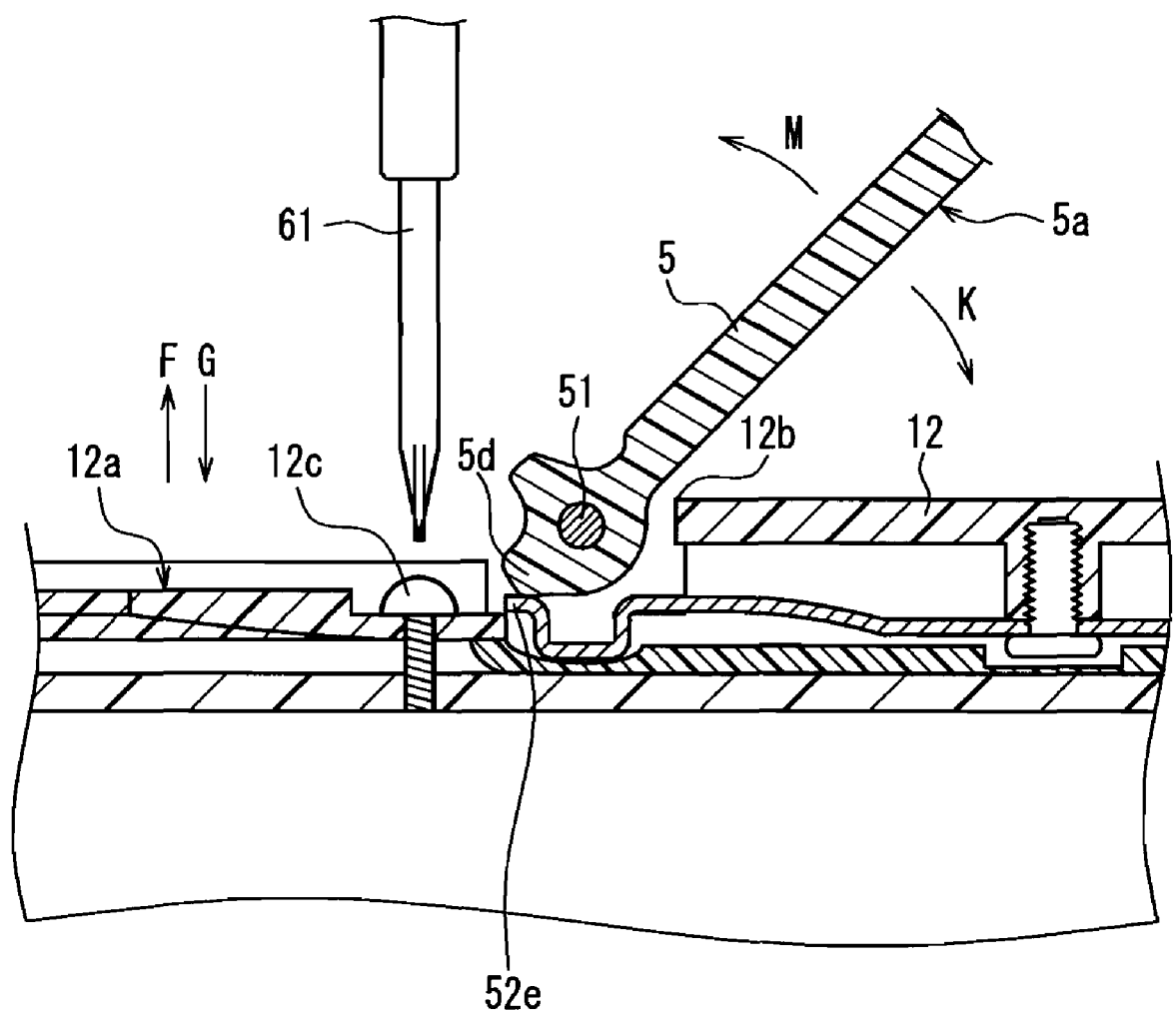
FIG. 9 is a cross-sectional view of the electronic device in which a screw is fastened.
Figure 10:
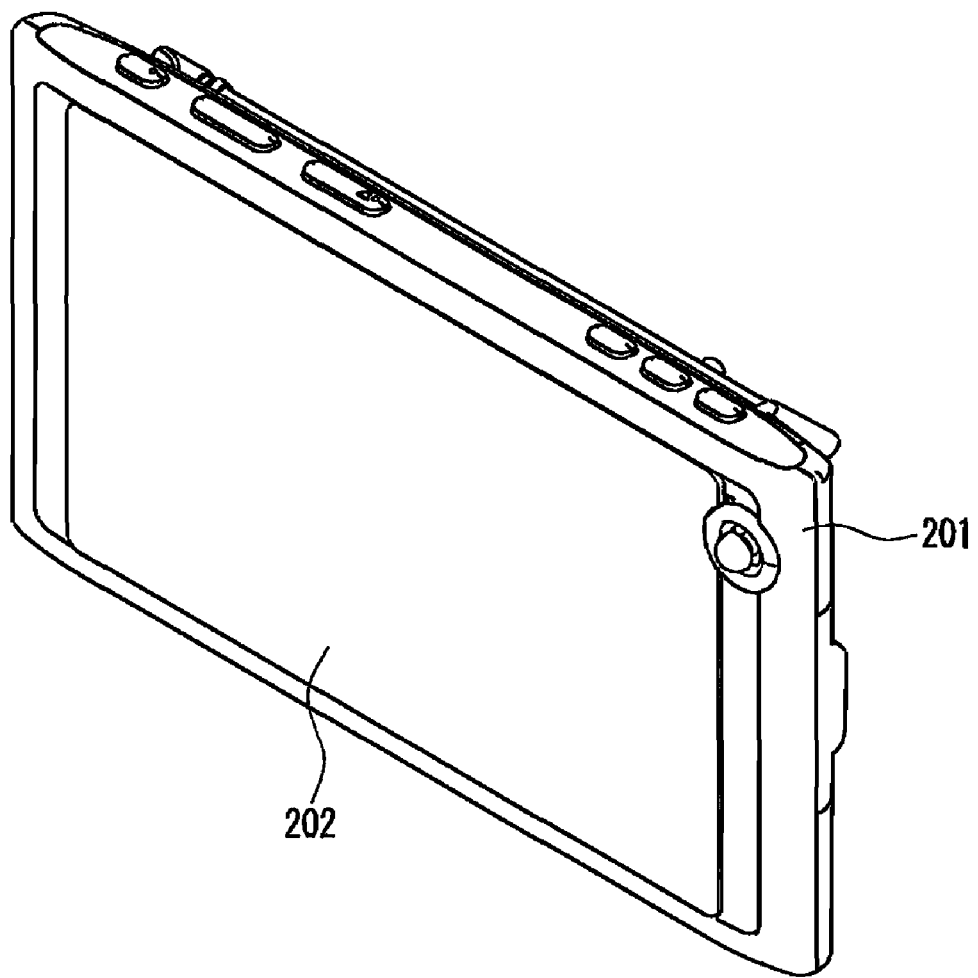
FIG. 10 is a perspective view of a conventional electronic device.
Figure 11:
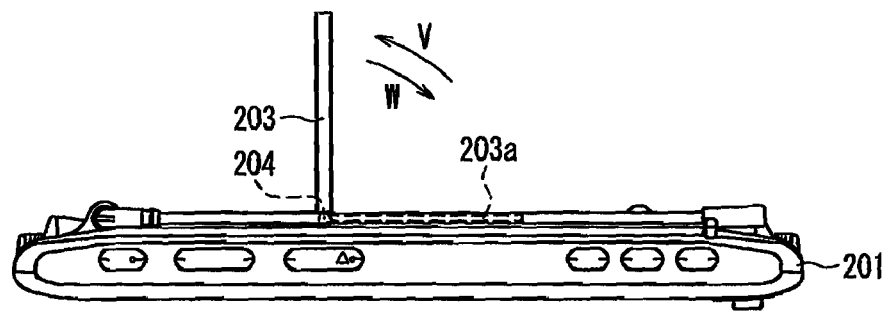
FIG. 11 is a top view of the conventional electronic device.
Figure 12:
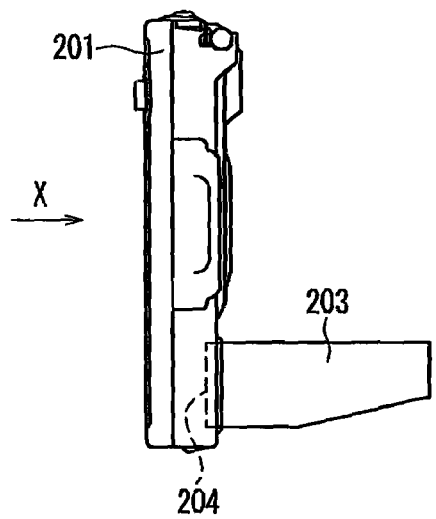
FIG. 12 is a right side view of the conventional electronic device.
Figure 13:
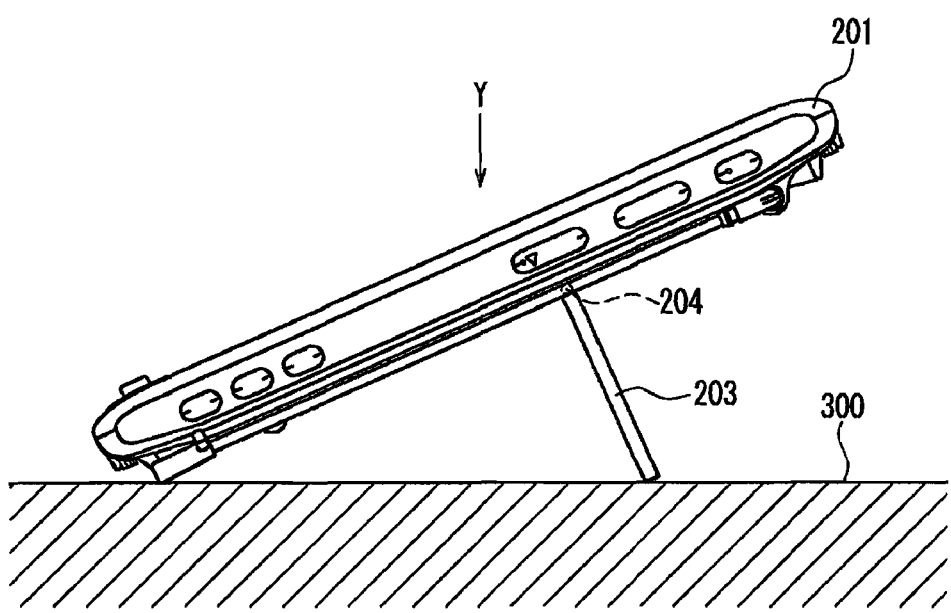
FIG. 13 is a side view showing a state in which the conventional electronic device has topped over on a back surface side.

Furthermore, the stand member 5 can be rotated to the second protruding position further from the first protruding position, whereby a screw 12c can be fastened easily with a driver 61 (see FIG. 9). The screw 12c fixes the back surface housing 12 to the housing 11. The screw 12c is placed at a position close to the spindle 51 in the concave portion 12a so as to enhance the strength of an attachment portion of the stand member 5 in the back surface housing 12. In the case where the screw 12c is placed at the position dose to the spindle 51, the driver 61 and the stand member 5 are likely to interfere with each other when the portable television is assembled. This makes it difficult to fit the front end of the driver 61 in a groove of a head portion of the screw 12c. Then, by enabling the stand member 5 to be rotated to the second protruding position as in the present embodiment, the interference between the driver 61 and the stand member 5 can be prevented when the front end of the driver 61 is fitted in the groove of the head portion of the screw 12c. Thus, the front end of the driver 61 can be fitted easily in the groove of the head portion of the screw 12c, whereby the ease of assembly can be enhanced.

Furthermore, because the interference between the driver 61 and the stand member 5 is prevented by enabling the stand member 5 to be rotated to the second protruding position, the screw 12c can be removed from the housing 1 easily when the housing 1 is decomposed so as to exchange or repair components built in the portable television. This can enhance the decomposition workability of the housing 1.

Furthermore, the plate spring portion 52c is provided at the holding member 52, and the stand member 5 is supplied with a rotation load when being rotated between the first protruding position and the second protruding position. More specifically, the rotation load applied to the stand member 5 between the stored position and the first protruding position is set to be larger than that applied to the stand member 5 between the first protruding position to the second protruding position. The user can feel that the rotation load of the stand member 5 is increased when the user rotates the stand member 5 from the stored position to the first protruding position, and thereafter, rotates the stand member 5 from the first protruding position to the second protruding position. Thus, the user can be encouraged not to rotate the stand member 5 from the first protruding position to the second protruding position.

In the present embodiment, a portable television receiver is illustrated as an exemplary electronic device. However, the present embodiment is effective as long as a device used at least in an upright posture by a stand, such as an electronic photostand for displaying a still image recorded on a memory card or a thin speaker unit in a stationary audio device, is used.

The stand member 5 in the present embodiment is an exemplary upright support member of the present invention. The housing 1 in the present embodiment is an exemplary housing of the present invention. The holding member 52 in the present embodiment is an exemplary holding member of the present invention.

The present invention is useful for an electronic device that can be placed at any place in an upright posture.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic device, comprising:
   a housing;
   a stand member rotatably attached to a back surface of the housing by a spindle, the stand member having a lower surface which is inclined with respect to a line orthogonal to the front surface of the housing; and
   a holding member configured to hold the stand member at a first protruding position where the stand member has been rotated a first angle of approximately 90 degrees from the housing and a second protruding position where the stand member has been rotated a second angle greater than the first angle from the housing,
   wherein when the holding member holds the stand member at the first protruding position, the housing is placed in an upright posture by the lower surface of the stand member,
   the holding member includes a regulating portion configured to regulate further rotation of the stand member at angles exceeding the second angle associated with the second protruding position; and
   wherein an end portion of the stand member abuts on the regulating portion of the holding member and is rotated between a plate spring portion and the regulating portion of the holding member in said second protruding position, such that the end portion of said stand member presses and elastically deforms said plate spring portion of the holding member.

2. The electronic device according to claim 1, wherein the stand member is formed of a flexible material.

3. The electronic device according to claim 1, wherein the holding member is configured to provide a force to the spindle when the holding member holds the stand member at the first and second protruding positions while a pressing force is applied to the housing in a direction from the front surface to the back surface, wherein the force provided by the holding member to the spindle is greater at the first protruding position than at the second protruding position.

4. The electronic device according to claim 1, wherein the second angle associated with the second protruding position is approximately 135 degrees from the housing.

5. An electronic device, comprising:
   a housing;
   a stand member rotatably attached to a spindle on the back surface of the housing, the stand member having a lower surface which is inclined with respect to a line orthogonal to the front surface of the housing; and
   a holding member including:
      a plate spring portion configured to engage with an end portion of the stand member and hold the stand member at a first protruding position where the stand member has been rotated a first angle of approximately 90 degrees from the housing; and
      a regulating portion configured to engage with the end portion of the stand member and hold the stand member at a second protruding position where the stand member has been rotated a second angle greater than the first angle from the housing and prevent further rotation greater than the second angle, wherein when the holding member holds the stand member at the first protruding position, the housing is placed in an upright posture by the lower surface of the stand member; and wherein the end portion of said stand member presses and elastically deforms the plate spring portion of the holding member when the stand member is at the second protruding position.

6. The electronic device according to claim 5, wherein the second angle associated with the second protruding position is approximately 135 degrees from the housing.

7. The electronic device according to claim 5, wherein the holding member is configured to provide a force to the spindle when the holding member holds the stand member at the first and second protruding positions while a pressing force is applied to the housing in a direction from the front surface to the back surface, wherein the force provided by the holding member to the spindle is greater at the first protruding position than at the second protruding position.

* * * * *